Dec. 7, 1926.
H. W. LARSSON
1,609,730
SHOCK ABSORBER
Filed Feb. 26, 1923
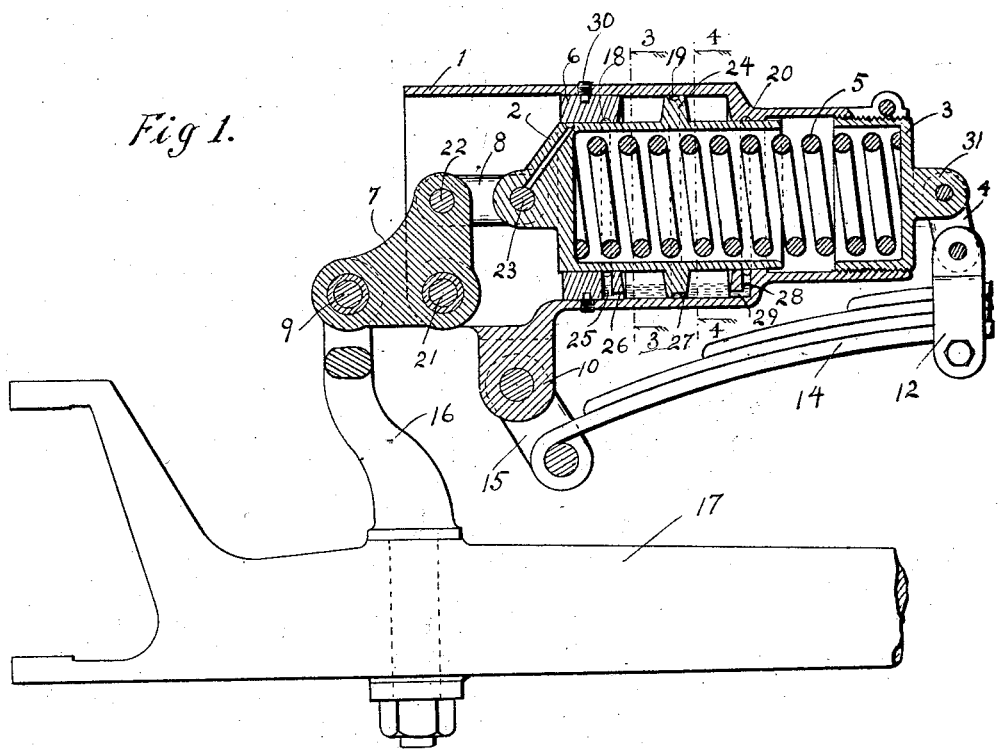
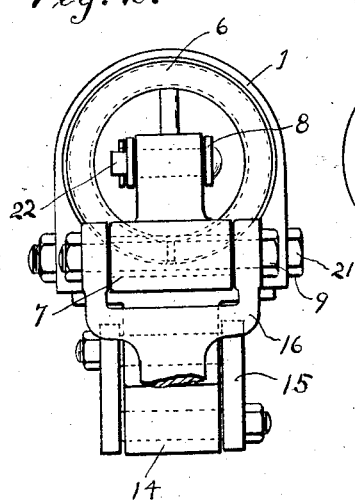
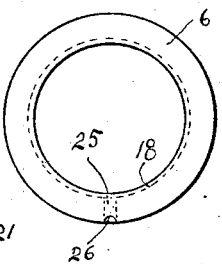
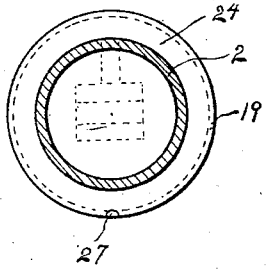
INVENTOR
Henry W. Larsson Patented Dec. 7, 1926.

1,609,730

UNITED STATES PATENT OFFICE.

HENRY W. LARSSON, OF OAKLAND, CALIFORNIA.

SHOCK ABSORBER.

Application filed February 26, 1923. Serial No. 621,389.

My invention is an improved shock absorber for automobiles.

One of the objects is to provide a horizental casing linked to an automobile spring, said casing forming a cylinder, wherein a piston is mounted. Air pockets are formed in the cylinder and around the piston to abate movements of the piston at either end of its stroke.

Another object is to impose a coiled spring between the piston head and the head of the casing, the said spring being more resilient and more sensitive than the automobile spring.

Another object is to pivot a bell crank in a horizontal casing, linking one of its arms to a piston head, and to pivot the other arm to an automobile axle. It will be noted that in this form of construction, the road shocks are imparted to the piston in a line of its axis, thus eliminating friction and wear on this important part of the shock absorber.

Another object is to provide an oiling system. I have devised positive means, whereby all the engaging surfaces of the piston and the casing have an ample supply of oil.

Another object in mounting the cylinder horizontally, is that the air pockets form a reservoir for the oil, and that the excess oil on the piston will drain back into said reservoir.

Another object is to provide a shock absorber which is simple in construction, efficient in its operation, and requiring little care.

In the drawings in which my invention is illustrated, I have shown it attached to a transverse spring construction; but I do not limit myself to this form, since it may be embodied in other forms, and in the annexed specification and appended claims, I desire to cover my invention in whatever form it may be embodied.

Referring to the drawings:

Fig. 1 is a longitudinal section of my shock absorber.

Fig. 2 is an end view of the same.

Fig. 3 is an end view of ring 6 viewed from line 3—3 of Fig. 1.

Fig. 4 is an end view of the piston partially in section, viewed from line 4—4 of Fig. 1.

Referring more particularly to the drawings, casing 1 is horizontally mounted on an automobile spring 14. A clip 12 is secured to the spring, a link 4 is pivoted to clip 12, and connects with lug 31, formed on plug 3, that forms the head on casing 1. Link 15 connects the outer end of the automobile spring 14 with lug 10 on casing 1. The casing 1 is bored to form a cylinder, having two diameters. The smaller diameter forming an inner bearing for the piston 2. In this cylinder the piston 2 is reciprocally mounted. A ring 6 is inserted into the cylinder, and secured by set screw 30. This ring 6 forms a bearing for the front end of piston 2, and also forms the front head of cylinder 1. Between this ring 6 and the back end of the larger bore of the cylinder 1 an air chamber is formed. An annular ring 24 is formed on piston 2. Its diameter is the same as the larger bore of the cylinder. This ring 24, working in the cylinder, produces an air cushion at either end of the stroke of the piston. Another function of this annular ring 24 is in connection with the oiling system. This ring 24 has a groove 19 on its periphery, and a duct 27 connects this groove 19 with the oil reservoir. A horizontal inward movement of the piston produces an air pressure on the oil in the reservoir, that forces the oil through the duct 27 into groove 19 and thoroughly oils the walls of the casing. In the smaller bore of casing 1 that forms the bearing for the body of the piston 2 an annular groove 20 is formed, and a passage 28 connects this groove with duct 29 that opens into the oil reservoir. A horizontal inward movement of the piston produces an air pressure on the oil in the reservoir, and forces the oil through duct 29 and into groove 20, thus oiling the inner bearing of the piston 2. An annular groove 18, a passage 25 and a duct 26 in ring 6, form an oiling system for the front end of the piston 2. An outward movement of the piston 2 produces an air pressure on the oil reservoir in the front air chamber, causing the oil to flow up into the groove 18, and thus thoroughly oiling the front bearing of the piston 2. The piston 2 is hollow, and a coiled compression spring 5 is interposed between its head and the head of casing 1. This spring 5 is of such tension as to balance the pressure against the piston head, and to hold the piston in a central position when at rest, as shown in Fig. 1. In the casing 1, the ball crank 7 is mounted. Bolt 21 forms its pivot. One of its arms is connected to the piston head 2 by a link 8 with pivots 22 and 23. The other arm of the bell crank 7 is pivoted to the perch 16, that is secured to the automobile axle 17, bolt 9 forming its pivot. A vertical movement of the outer arm of said bell crank, relatively to the casing, produces a horizontal movement of its other arm, relatively to the casing, and link 8 transmits this movement to piston head 2. This construction allows piston 2 to float in its bearings, as the stress against the piston 2 is on a line of its axis. It is thus obvious that friction is reduced to a minimum. This is of great importance, as on the sensitive movement of piston 2 depends the efficiency of the shock absorber.

In action, when the automobile is moving over the road, and the wheel strikes an obstruction, thus causing an upward movement of the axle, this movement is imparted to the piston 2 through the bell crank 7, and link 8, causing it to be pressed into the cylinder 1. This action takes place before the automobile spring has time to act, as the spring behind the piston 2 is more resilient and sensitive in its action than the automobile spring 14, and should the road shock be severe enough to force the piston to the end of its inward stroke, the air cushion formed between the annular ring 24 on piston 2, and casing 1 will abate its motion. If the case should be reversed, so that the wheel should drop into a depression in the road, thus causing a downward movement of the axle, the piston will move outward and take up this movement before the automobile spring has time to act, thus giving the desired shock absorbing effect. And should this motion be great enough to allow the piston its full forward stroke, the air cushion formed in this end of the cylinder will abate its movement.

Having thus described my invention, what I claim and desire to secure by Letters Patent is—

1. In a shock absorber of the character described, a cylinder having two chambers formed therein, one larger than the other, a head member for each end of the cylinder, a piston in the cylinder extending through one head member and having a sliding fit therein, an exterior ring on the piston having a sliding fit within the cylinder chamber of large diameter, said ring dividing said cylinder chamber into two air cushioning compartments, a spring engageable with one end of the piston and resisting movement in one direction, a bell crank pivotally mounted on one end of the cylinder, and a link connection between one end of the bell crank and the piston.

2. In a shock absorber of the character described, a cylinder having two chambers formed therein, one larger than the other, a head member for each end of the cylinder, a piston in the cylinder extending through one head member and having a sliding fit therein, an exterior ring on the piston and having a sliding fit within the cylinder and dividing one cylinder chamber into two air cushioning compartments, a spring engageable with one end of the piston and resisting movement in one direction, a bell crank pivotally mounted on one end of the cylinder, and a link connection between one end of the bell crank and the piston.

3. In combination with an automobile spring and axle, a shock absorber comprising a horizontal outer casing, a piston within said casing, spring means positioned between said piston and said casing, means for pivoting said casing to said automobile spring, means for pivoting said piston to said axle through a bell crank pivoted in said casing, a ring surrounding said piston and secured in said casing, a second ring surrounding said piston, formed at the inner end of said casing, and an annular ring formed on said piston between said first and second named rings, substantially as described.

4. In combination with an automobile spring and axle, a shock absorber comprising a horizontal outer casing, a piston within said casing, spring means positioned between said piston and said casing, means for mounting said casing to the automobile spring, means for pivoting said piston to said axle through a bell crank and means secured in said casing whereby an air space is formed on both sides of a ring formed on said piston.

5. In combination with an automobile spring and axle, a shock absorber comprising a horizontal outer casing and a piston within said casing spaced therefrom by a spring postioned between said piston and said casing, said casing suitably secured to said spring, a bell crank pivoted in said casing, one arm of said bell crank linked to said piston, a ring encircling the front end of said piston, a second ring encircling said piston at the inner end thereof, an annular ring formed on said piston between said first mentioned ring and said second ring, whereby air spaces are formed between them, substantially as described.

6. In combination with an automobile spring and axle, a shock absorber comprising a horizontal cylinder suitably connected to said spring, a piston within said cylinder, spring means positioned between the head of said piston and the head of said cylinder, an inner bearing for said piston formed in said cylinder, an annular groove formed in said bearing, a passage connecting said groove with an oil reservoir, a ring secured in the front end of said cylinder forming the front head of said cylinder and front bearing for said piston, an annular groove formed in said bearing with a passage connecting said groove with an oil reservoir, an air space and oil reservoir formed in the cylinder between the inner and outer bearing of said piston, a ring formed on said piston dividing said air space and oil reservoir, an annular groove formed on the periphery of said ring, a passage connecting said groove to said oil reservoir, a bell crank pivoted to said cylinder, means for connecting one arm of said bell crank to the piston and means for connecting the other arm of said bell crank to said automobile axle.

7. In a shock absorber of the character described, a cylinder having two chambers formed therein, one larger than the other, a head member for each end of the cylinder, a piston in the cylinder extending through one head member and having a sliding fit therein, and also having a sliding fit in the cylinder chamber of smaller diameter, an exterior ring on the piston having a sliding fit with the cylinder chamber of larger diameter, said ring dividing said cylinder chamber into two air cushioning compartments, a spring in the chamber of smaller diameter engaging the piston at one end and the head member at the other end, means permitting adjustment of said head member to increase or decrease the tension of said spring, a bell crank pivotally mounted on the cylinder, and a link connection between one end of said bell crank and the piston.

8. The combination with the spring and the axle of a vehicle, of a cylinder lying substantially parallel with a spring, a piston in the cylinder, a link connection between the piston and the axle, a pair of link connections between the cylinder and the spring, said links being disposed at opposite ends of the cylinder, spring means resisting movement of the piston in one direction, and pneumatic actuated means resisting movement of the piston in both directions.

9. The combination with the spring and the axle of a vehicle, of a cylinder supported by the spring and lying substantially parallel therewith, a piston in the cylinder, a link connection between the piston and the axle, a pair of links connecting the cylinder and the spring, said links being disposed at opposite ends of the cylinder, springs means resisting movement of the piston in one direction, and pneumatic actuated means resisting movement of the piston in both directions.

10. The combination with the axle and spring of a vehicle, of a cylinder supported by the spring and lying substantially parallel therewith, a piston in the cylinder, a bell crank pivotally mounted on one end of the cylinder, a link connection between the piston and one end of the bell crank, another connection between the bell crank and the axle, spring means resisting movement of the piston within the cylinder in one direction, and pneumatic actuated means resisting movement of the piston within the cylinder in both directions.

11. In a shock absorber of the character described, a cylinder having two chambers formed therein, one larger than the other, a head member for each end of the cylinder, a piston in the cylinder extending through one head member and having a sliding fit therein, an exterior ring on the piston having a sliding fit within the cylinder chamber of larger diameter, said ring dividing said cylinder into two air cushioning compartments, a spring engageable with one end of the piston and resisting movement in one direction, a vehicle spring, means supporting the cylinder with relation thereto, a vehicle axle and a connection between the axle and the piston.

12. In a shock absorber of the character described, a cylinder having two chambers formed therein, one larger than the other, a head member for each end of the cylinder, a piston in the cylinder extending through one head member and having a sliding fit therein, an exterior ring on the piston and having a sliding fit within the cylinder and dividing one cylinder chamber into two air cushioning compartments, a spring engageable with one end of the piston and resisting movement in one direction, a semi-elliptical spring, a flexible connection between the spring and the cylinder and forming a support for the cylinder, and means whereby flexing of said spring is transmitted and resisted by the piston.

HENRY W. LARSSON.